United States Patent
Liang et al.

(10) Patent No.: US 11,291,318 B2
(45) Date of Patent: Apr. 5, 2022

(54) QUILT STRUCTURE WITH NON-POWERED ENERGY LAYER AND FAR-INFRARED FIBERS TO MAKE THE SAME

(71) Applicant: GREEN ENERGY NANO TECHNOLOGY CO., LTD., Taipei (TW)

(72) Inventors: Tien-Show Liang, Taipei (TW); Shu Han Liang, Taipei (TW); Shu Ting Liang, Taipei (TW); Sheng-Tang Wu, Taipei (TW); En Meng, Taipei (TW); Juin-Hong Cherng, Taipei (TW); Wen Sheng Lee, Taipei (TW); Shu-Jen Chang, Taipei (TW); Chia-Yu Wang, Taipei (TW)

(73) Assignee: GREEN ENERGY NANO TECHNOLOGY CO., LTD., Taipei (TW)

( * ) Notice: Subject to any disclaimer, the term of this patent is extended or adjusted under 35 U.S.C. 154(b) by 189 days.

(21) Appl. No.: 16/669,430

(22) Filed: Oct. 30, 2019

(65) Prior Publication Data
US 2020/0128977 A1 Apr. 30, 2020

(30) Foreign Application Priority Data

Oct. 30, 2018 (TW) ................. 107138401
Nov. 15, 2018 (TW) ................. 107140597

(51) Int. Cl.
*A47G 9/00* (2006.01)
*A47G 9/02* (2006.01)
*D05B 93/00* (2006.01)

(52) U.S. Cl.
CPC ........... *A47G 9/007* (2013.01); *A47G 9/0223* (2013.01); *D05B 93/00* (2013.01)

(58) Field of Classification Search
CPC .... A47G 9/007; A47G 9/0223; A47G 9/0207; A47G 9/0238; D05B 93/00;
(Continued)

(56) References Cited

U.S. PATENT DOCUMENTS 4,420,521 A * 12/1983 Carr .................. B32B 27/12
428/74
4,525,406 A * 6/1985 Pollock ............... A47G 9/0207
428/137
(Continued)

FOREIGN PATENT DOCUMENTS

CN 101144217 A 3/2008
CN 201481701 U 5/2010
(Continued)

OTHER PUBLICATIONS

Vatansever et al., Far infrared radiation (FIR): its biological effects and medical applications, Nov. 1, 2012, Photonics Lasers Med., 4:255-266 (Year: 2012).*
(Continued)

*Primary Examiner* — Myles A Throop
(74) *Attorney, Agent, or Firm* — Skaar Ulbrich Macari, P.A.

(57) ABSTRACT

A quilt structure with non-powered energy layer having an insulating layer, a first barrier layer, a second barrier layer, a first fabric layer and a second fabric layer is provided. The first barrier layer and the second barrier layer are disposed on two opposite sides of the insulating layer. The first fabric layer is disposed on one of the first barrier layer or the second barrier layer opposite the insulating layer, and the second fabric layer is disposed on another of the first barrier layer or the second barrier layer opposite the insulating
(Continued)

layer. At least one of the insulating layer, the first fabric layer and the second fabric layer has bio-energetic fibers or far-infrared fibers.

14 Claims, 8 Drawing Sheets

(58) Field of Classification Search
CPC ..... B32B 2307/4023; B32B 5/06; B32B 7/05; B32B 2307/30; B32B 2262/062; B32B 2255/205; B32B 2255/02; B32B 2262/08; B32B 9/02; B32B 5/022; B32B 5/26; B32B 2262/103; B32B 2250/05; B32B 2250/20; B32B 2264/105; A61N 5/06; A61N 2005/066
USPC .......................................................... 5/502
See application file for complete search history.

(56) References Cited

U.S. PATENT DOCUMENTS

| | | | | |
|---|---|---|---|---|
| 4,560,595 | A * | 12/1985 | Johansson | B32B 5/022 428/17 |
| 4,569,874 | A * | 2/1986 | Kuznetz | B32B 38/04 428/109 |
| 4,999,243 | A * | 3/1991 | Maeda | D01D 5/30 139/420 A |
| 6,511,198 | B1 * | 1/2003 | Erickson | A41D 27/085 313/510 |
| 10,158,121 | B2 * | 12/2018 | Zhamu | H01M 4/663 |
| 10,160,184 | B2 * | 12/2018 | Conolly | B32B 5/024 |
| 11,000,695 | B2 * | 5/2021 | Liang | A61N 5/0613 |
| 2004/0214495 | A1 * | 10/2004 | Foss | B32B 27/302 442/199 |
| 2008/0063875 | A1 * | 3/2008 | Robinson | B32B 5/18 428/426 |
| 2012/0157904 | A1 * | 6/2012 | Stein | D04H 1/407 602/43 |
| 2013/0341819 | A1 * | 12/2013 | Liang | A47G 9/007 264/103 |
| 2015/0216333 | A1 * | 8/2015 | Liang | A47C 31/00 264/103 |
| 2016/0076170 | A1 * | 3/2016 | Blaney | B32B 27/12 428/212 |
| 2017/0145596 | A1 * | 5/2017 | Hays | D03D 15/00 |
| 2019/0090666 | A1 * | 3/2019 | Bishop | A47G 9/0261 |

FOREIGN PATENT DOCUMENTS

| | | |
|---|---|---|
| CN | 102433763 A | 5/2012 |
| CN | 103504885 A | 1/2014 |
| CN | 210540422 U | 5/2020 |
| EP | 3460109 A1 | 3/2019 |
| GB | 2303375 B | 8/1999 |
| JP | 63152413 A | 6/1988 |
| JP | 2001161530 A | 6/2001 |
| JP | 2003342830 A | 12/2003 |
| JP | 2004135712 A | 5/2004 |
| JP | 2005013574 A | 1/2005 |
| JP | 2009097105 A | 5/2009 |
| TW | M496479 | 3/2015 |
| WO | 03055361 A1 | 7/2003 |

OTHER PUBLICATIONS

Office Action to the corresponding Taiwan Patent Application dated Aug. 28, 2019, 11 pages (including English translation).
The extended European Search Report rendered by the European Patent Office (EPO) for corresponding European Patent Application No. 19206183.6, dated Mar. 20, 2020, 7 pages.
Office Action to the corresponding Taiwan Patent Application rendered by the Taiwan Intellectual Property Office (TIPO) dated Mar. 29, 2021, 8 pages.
Office Action to the corresponding Chinese Patent Application rendered by the China National Intellectual Property Administration (CNIPA) dated Mar. 30, 2021, 10 pages.

* cited by examiner

QUILT STRUCTURE WITH NON-POWERED ENERGY LAYER AND FAR-INFRARED FIBERS TO MAKE THE SAME

PRIORITY

This application claims priorities to Taiwan Patent Application No. 107138401 filed on Oct. 30, 2018 and Taiwan Patent Application No. 107140597 filed on Nov. 15, 2018, which are hereby incorporated by reference in their entirety.

FIELD

The present invention relates to a quilt structure with a non-powered energy layer, and more particularly, relates to a quilt structure with a non-powered energy layer that is made of bio-energetic fibers or far-infrared fibers.

BACKGROUND

Among bedding and medical bedding products, many manufacturers claim that products thereof have the function of radiating far-infrared rays and thus are capable of promoting the blood circulation or body metabolism of users. However, the manufacturers can hardly present actual research or test data to prove that these products indeed have the claimed efficacy.

Moreover, Far-Infrared (FIR) rays generally refer to infrared rays with a wavelength of 5.6 to 1000 micrometers (μm), but in terms of efficacy, far-infrared rays with a wavelength of 4 to 14 micrometers can achieve the best effect of resonating with the molecules of the human body so as to promote microvascular expansion, smooth blood circulation and promote metabolism.

Some manufacturers in the market even arbitrarily fill the bedding and medical bedding products with special fibers or powders that are said being capable of radiating far-infrared wavelengths without awareness of the basic principle of far-infrared rays. Therefore, the claimed effect cannot be achieved, and moreover, the body may feel discomfortable due to excessive absorption of radioactive energy.

Accordingly, an urgent need exists in the art to provide a bedding product (e.g., a quilt structure) utilizing bio-energetic fibers or far-infrared fibers that can accurately radiate far-infrared rays with a wavelength of 4 to 14 micrometers and prove the efficacy thereof by actual research or test data to ensure the rights and interests of consumers.

SUMMARY

An objective herein is to provide a quilt structure with a non-powered energy layer, in which a first barrier layer and a second barrier layer may be disposed at two sides of an insulating layer so as to prevent materials inside the insulating layer from escaping or being exposed to the outside.

Another objective is to provide bio-energetic fibers or far-infrared fibers that are used to make the quilt structure with a non-powered energy layer, and the bio-energetic fibers or the far-infrared fibers may be woven into at least one of an insulating layer, a first barrier layer, a second barrier layer, a first fabric layer or a second fabric layer of the quilt structure to form a non-powered energy layer, thereby achieving the effect of radiating far-infrared energy in a non-powered manner during the use thereof.

The disclosure includes a quilt structure with a non-powered energy layer provided by the present invention comprises an insulating layer, a first barrier layer, a second barrier layer, a first fabric layer and a second fabric layer. The first barrier layer and the second barrier layer are respectively disposed on two opposite sides of the insulating layer. The first fabric layer is disposed on one of the first barrier layer or the second barrier layer opposite the insulating layer, and the second fabric layer is disposed on another of the first barrier layer or the second barrier layer opposite the insulating layer. At least one of the insulating layer, the first fabric layer and the second fabric layer has bio-energetic fibers or far-infrared fibers.

Preferably, the first fabric layer and the second fabric layer are fleece fabric, breathable fabric or a combination thereof.

Preferably, the first barrier layer and the second barrier layer are non-woven fabric or fabric containing printing paints.

Preferably, the insulating layer is made of wool, silk, cellucotton, cotton, down feather or a combination thereof.

Preferably, at least one of the first barrier layer or the second barrier layer is a textile containing a metal material.

Preferably, the metal material is disposed in at least one of the first barrier layer or the second barrier layer by being formed into metal fibers.

Preferably, the metal material is disposed in at least one of the first barrier layer or the second barrier layer by a coating process.

Preferably, the metal material is disposed at a side towards the insulating layer.

Preferably, the metal material is particles of a metal selected from a group consisting of: gold (Au), platinum (Pt) and a combination thereof.

The disclosure also includes bio-energetic fibers or far-infrared fibers for making the quilt structure with a non-powered energy layer provided by the present invention comprise a first polymer matrix and a first bio-energetic filler or a first far-infrared filler. The first bio-energetic filler or the first far-infrared filler is dispersed in the first polymer matrix, and the first bio-energetic filler or the first far-infrared filler contains the following elements: titanium (Ti), germanium (Ge), zinc (Zn), aluminium (Al) and magnesium (Mg), and wherein the first bio-energetic filler or the first far-infrared filler does not contain the following elements: scandium (Sc), vanadium (V), chromium (Cr), cobalt (Co), and antimony (Sb).

Preferably, the first bio-energetic filler or the first far-infrared filler further contains elements selected from a group consisting of: silicon (Si), copper (Cu), calcium (Ca), iron (Fe), barium (Ba), potassium (K), sodium (Na), and a combination thereof.

Preferably, the first bio-energetic filler or the first far-infrared filler further contains elements selected from a group consisting of: manganese (Mn), nickel (Ni), gallium (Ga), and a combination thereof.

Preferably, the bio-energetic fibers or far-infrared fibers further comprise a second polymer matrix, the second polymer matrix covers the first polymer matrix, and the second polymer matrix has a second bio-energetic filler or a second far-infrared filler dispersed therein.

Preferably, the second bio-energetic filler or the second far-infrared filler contains the following elements: titanium, germanium, zinc, aluminium and magnesium.

The detailed technology and preferred embodiments implemented for the subject invention are described in the following paragraphs accompanying the appended drawings for people skilled in this field to well appreciate the features of the claimed invention.

DETAILED DESCRIPTION

Specific example embodiments will be specifically described hereinafter. However, the present invention may be practiced in various different forms without departing from the spirit of the present invention, and the scope claimed should not be construed as being limited to only those examples set forth in the specification. In addition, technical contents of the embodiments in the above summary of the present invention may also serve as the technical contents of the embodiments or as possible variations of the example embodiments.

Figure 1:
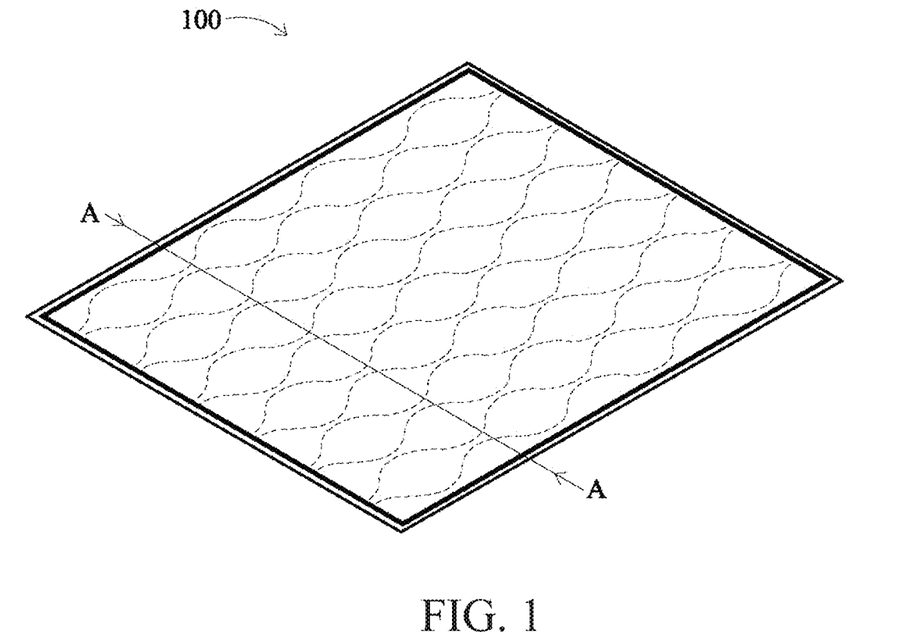
FIG. 1 is a perspective view of a quilt structure according to the present invention.

Please refer to FIG. 1, and FIG. 1 is a perspective view of a quilt structure 100 with a non-powered energy layer according to the present invention. As shown in FIG. 1, the quilt structure 100 is depicted as a quilt in this embodiment, but it is not limited thereto. In other words, the quilt structure 100 may also be used as a mattress or cushion.

Please continue to refer to an embodiment shown in FIG. 2, wherein the quilt structure 100 comprises an insulating layer 110, a first barrier layer 120, a second barrier layer 130, a first fabric layer 140 and a second fabric layer 150, and arrangement relationships among these elements will be further described hereinafter.

First, in the present invention, the first barrier layer 120 and the second barrier layer 130 are respectively disposed on two opposite sides of the insulating layer 110, and the first fabric layer 140 is disposed on one of the first barrier layer 120 or the second barrier layer 130 opposite the insulating layer 110, while the second fabric layer 150 is disposed on another of the first barrier layer 120 or the second barrier layer 130 opposite the insulating layer 110. In other words, in the embodiment as shown in FIG. 2, when the first fabric layer 140 and the second fabric layer 150 cover the insulating layer 110 respectively from the upper side and the lower side, the first barrier layer 120 and the second barrier layer 130 may be adapted to be interposed respectively between the first fabric layer 140 and the insulating layer 110 and between the insulating layer 110 and the second fabric layer 150.

Moreover, at least one of the insulating layer 110, the first fabric layer 140 or the second fabric layer 150 comprises bio-energetic fibers or far-infrared fibers 200 so that the specific layer comprising the bio-energetic fibers or the far-infrared fibers 200 may be formed into a non-powered energy layer. In other words, the specific layer comprising the bio-energetic fibers or the far-infrared fibers 200 can achieve the effect of radiating far-infrared energy in a non-powered manner (i.e., without applying an additional power) during the use thereof.

Figure 2:
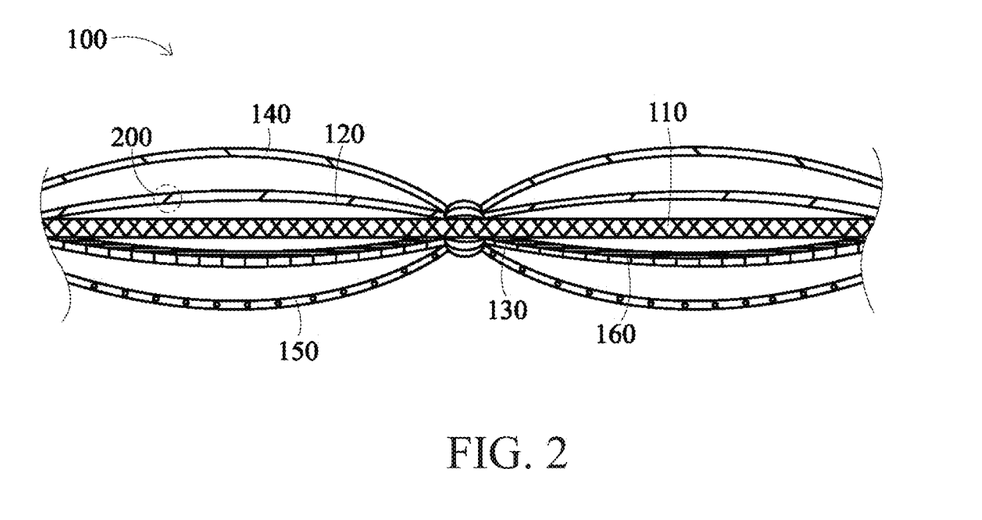
FIG. 2 is a cross-sectional view of the quilt structure shown in FIG. 1.

Furthermore, the positions of the first barrier layer 120 and the second barrier layer 130 in FIG. 2 may also be exchanged. That is, as shown in an embodiment of FIG. 3, when the first fabric layer 140 and the second fabric layer 150 cover the insulating layer 110 respectively from the upper side and the lower side, the second barrier layer 130 is interposed between the upper first fabric layer 140 and the insulating layer 110, and the first barrier layer 120 is interposed between the insulating layer 110 and the lower second fabric layer 150.

Specifically, the insulating layer 110 comprised in the quilt structure 100 of the present invention may comprise wool, silk, cellucotton, cotton, down feather or a combination thereof. When cotton is taken as an example of the insulating layer 110 of this embodiment, the denier of the cotton is preferably 1.5. In this way, by using cotton of lower denier, the overall softness of the quilt structure 100 can be increased while maintaining the insulating effect of the insulating layer 110.

Moreover, the first fabric layer 140 and the second fabric layer 150 are fleece fabric, breathable fabric or a combination thereof, and the first barrier layer 120 and the second barrier layer 130 are non-woven fabric or fabric containing printing paints.

In the present invention, at least one of the first barrier layer 120 or the second barrier layer 130 is a textile containing a metal material 160. That is, the metal material 160 may be disposed in at least one of the first barrier layer 120 or the second barrier layer 130 by being formed into metal fibers, or the metal material 160 may also be disposed in at least one of the first barrier layer 120 or the second barrier layer 130 by a coating process.

As for the use of the fabric layers, in a preferred embodiment of the present invention, the first fabric layer 140 may adopt breathable fabric, while the second fabric layer 150 may adopt fleece fabric. In this way, the quilt structure 100 of this embodiment may be used as a dual-purpose quilt that is cool in summer and warm in winter.

In another embodiment, both the first fabric layer 140 and the second fabric layer 150 of the quilt structure 100 may adopt the breathable fabric so that the quilt structure 100 is only used as a breathable quilt or sleeping mat used in summer.

In yet another embodiment, both the first fabric layer 140 and the second fabric layer 150 may adopt the fleece fabric so that the quilt structure 100 may be used as a warm quilt or mattress used in winter.

In other words, no matter the first fabric layer 140 and the second fabric layer 150 adopt the same or different fabric, consumers may select depending on different use requirements thereof.

As for the first barrier layer 120 and the second barrier layer 130, in a preferred embodiment of the present invention, the first barrier layer 120 may adopt non-woven fabric, and the second barrier layer 130 may be a textile containing a metal material 160. More particularly, referring to FIG. 2, if the cotton of the insulating layer 110 has a lower denier, the softness thereof is better; however, the cotton fibers are finer, so the cotton of the insulating layer 110 is more likely to escape from gaps of the first fabric layer 140 and/or the second fabric layer 150 without the arrangement of the first barrier layer 120 and the second barrier layer 130. After the arrangement of the first barrier layer 120 and the second barrier layer 130, the non-woven fabric of the first barrier layer 120 and the textile containing the metal material 160 of the second barrier layer 130 can effectively prevent the fine cotton fibers from escaping from the gaps of the first fabric layer 140 and/or the second fabric layer 150.

In the embodiment shown in FIG. 2, the metal material 160 of the second barrier layer 130 is coated on the second barrier layer 130, the metal material 160 also has the effect of radiating far-infrared rays, and the metal material 160 is disposed on the second barrier layer 130 by facing a side of the insulating layer 110. In detail, in the embodiment of FIG. 2, by disposing the metal material 160 on a side of the second barrier layer 130 that faces the insulating layer 110 through a coating process, even if the metal material 160 falls off after the quilt structure 100 has been used for a long time, the part of the metal material 160 that falls off will not escape from the gaps of the second fabric layer 150 and thus influence the user.

Figure 3:
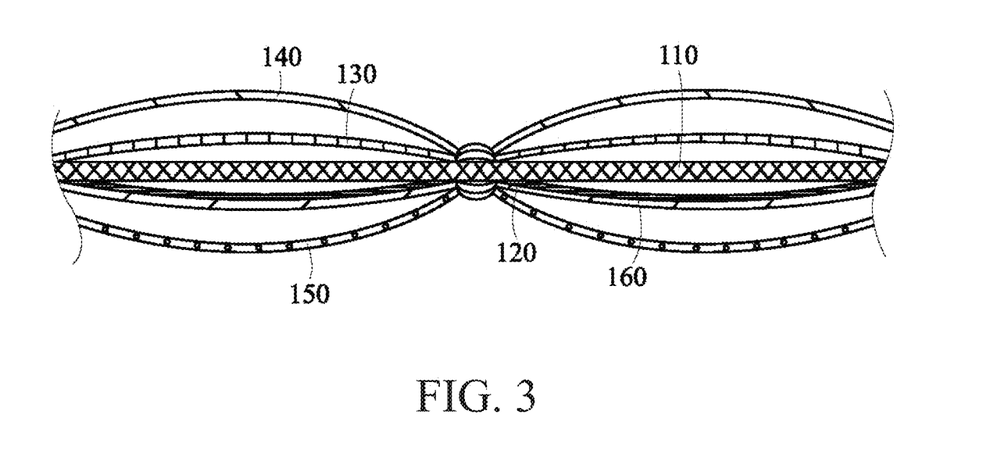
FIG. 3 is a cross-sectional view of another aspect of the quilt structure shown in FIG. 1.

Additionally, in another aspect shown in FIG. 3, the metal material 160 shown in FIG. 2 is simply changed to be coated on a side of the first barrier layer 120 that faces the insulating layer 110, so the coated metal material 160 also avoids the drawback of escaping from the gaps of the second fabric layer 150.

Figure 4:
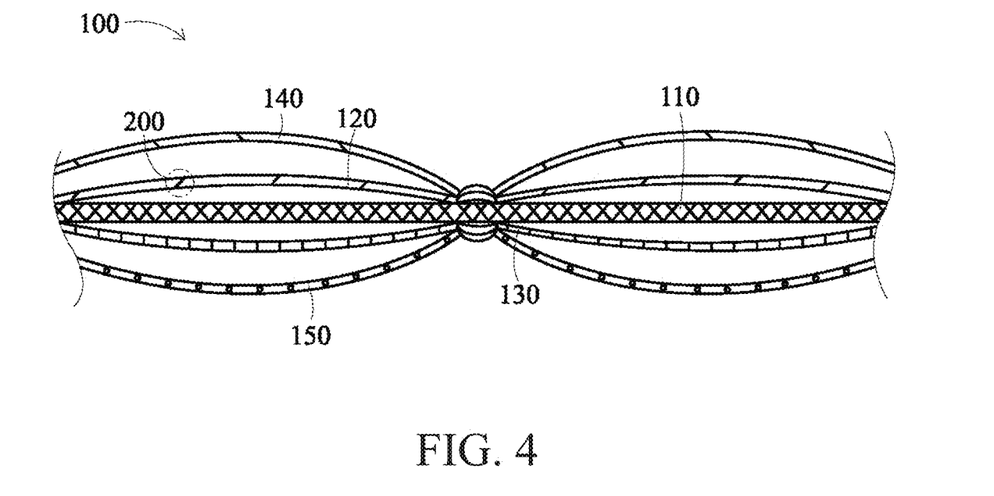
FIG. 4 is a cross-sectional view of another embodiment of a quilt structure according to the present invention.

In the embodiment shown in FIG. 4, the metal material 160 is disposed within the second barrier layer 130 by being formed into metal fibers, so the second barrier layer 130 at this point is a blended fabric, and falling-off of the metal material 160 will not occur to the second barrier layer 130 as a blended fabric.

The metal material 160 described above is metal particles comprising a group consisting of: gold (Au), platinum (Pt) and a combination thereof.

Figure 5:
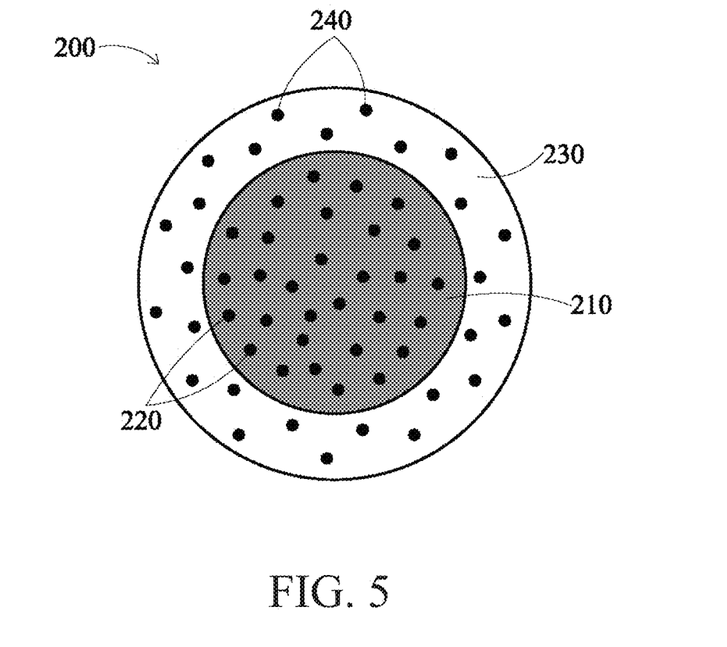
FIG. 5 is a cross-sectional view of bio-energetic fibers or far-infrared fibers included in the quilt structure shown in FIG. 2.

Next, referring to FIG. 5, FIG. 5 is a cross-sectional view of the bio-energetic fibers or the far-infrared fibers 200 of the quilt structure 100 according to the present invention. As shown in FIG. 5, the bio-energetic fibers or the far-infrared fibers 200 comprises a first polymer matrix 210 and a first bio-energetic filler or a first far-infrared filler 220, and the first bio-energetic filler or the first far-infrared filler 220 is dispersed in the first polymer matrix 210. The first bio-energetic filler or the first far-infrared filler 220 contains the following elements: titanium (Ti), germanium (Ge), zinc (Zn), aluminium (Al) and magnesium (Mg), and the first bio-energetic filler or the first far-infrared filler 220 does not contain the following elements: scandium (Sc), vanadium (V), chromium (Cr), cobalt (Co), and antimony (Sb).

Additionally, the first bio-energetic filler or the first far-infrared filler 220 further contains elements selected from a group consisting of: silicon (Si), copper (Cu), calcium (Ca), iron (Fe), barium (Ba), potassium (K), sodium (Na), and a combination thereof. Furthermore, the first bio-energetic filler or the first far-infrared filler 220 also contains elements selected from a group consisting of: manganese (Mn), nickel (Ni), gallium (Ga), and a combination thereof, thereby achieving the effect of radiating far-infrared rays.

Further speaking, the first bio-energetic filler or the first far-infrared filler 220 further comprises a second polymer matrix 230, and the second polymer matrix 230 is disposed to cover the first polymer matrix 210, and the second polymer matrix 230 has a second bio-energetic filler or a second far-infrared filler 240 dispersed therein. Additionally, the second bio-energetic filler or the second far-infrared filler 240 also contains the following elements: titanium, germanium, zinc, aluminium and magnesium.

Figure 6:
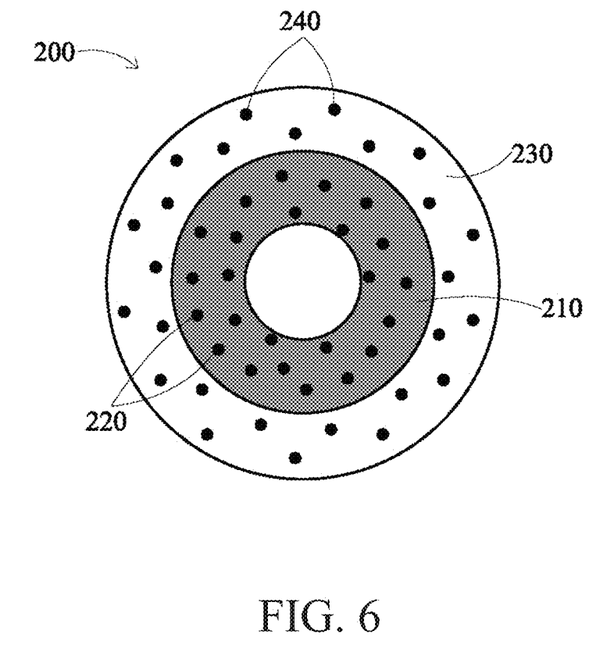
FIG. 6 is a cross-sectional view of another embodiment of bio-energetic fibers or far-infrared fibers included in the quilt structure shown in FIG. 2.

FIG. 6 is a cross-sectional view of another embodiment of the bio-energetic fibers or the far-infrared fibers 200 of the quilt structure 100 according to the present invention, which differs from FIG. 5 only in that: the bio-energetic fibers or the far-infrared fibers 200 of FIG. 6 are hollow fibers in order to achieve a light weight and good elasticity.

Regarding the function of radiating far-infrared rays by the quilt structure 100 of the present invention which is achieved by using the bio-energetic fibers or the far-infrared fibers 200, the following experiments (1), (2) and (3) have been disclosed.

First, the experimental method adopted in Experiment (1) is as follows: during the test, a subject lay down and was covered by the quilt structure 100 having the bio-energetic fibers or the far-infrared fibers 200 for 30 minutes, and then the blood flow volume, the blood flow rate and the skin temperature of the subject were measured, and the results were recorded in Table 1.

TABLE 1

| Measurement items | | Measurement results | | |
|---|---|---|---|---|
| | | Abdomen | Waist | Shoulder |
| Blood flow volume | Adaptation period | 36.6 | 60.0 | 37.9 |
| | Test period | 54.3 | 73.0 | 49.0 |
| | Rate of change (%) | 48.5 | 21.7 | 29.3 |
| Blood flow rate | Adaptation period | 9.0 | 12.0 | 7.8 |
| | Test period | 13.5 | 14.0 | 8.8 |
| | Rate of change (%) | 50.0 | 16.7 | 12.9 |
| Skin temperature (° C.) | Adaptation period | 31.3 | 31.2 | 31.4 |
| | Test period | 33.3 | 32.6 | 33.5 |
| | Rate of change (%) | 2.0 | 1.4 | 2.1 |

As can be seen from Table 1, after the subject was covered by the quilt structure 100 having the bio-energetic fibers or the far-infrared fibers 200 of the present invention, the blood flow volume and the blood flow rate of the abdomen, waist and shoulder were all significantly increased, and the skin temperature was not changed significantly but only slightly increased. This result shows that the quilt structure 100 having the bio-energetic fibers or the far-infrared fibers 200 of the present invention can effectively improve blood circulation while raising the body surface temperature of the user within a safe range and maintaining a normal blood pressure pulse.

The experimental method adopted in Experiment (2) is as follows: differences between a mattress provided with the quilt structure 100 having the bio-energetic fibers or the far-infrared fibers 200 of the present invention and a general mattress were compared in terms of improving the surface microcirculation effect of diabetic patients (type 2). Measurement positions were the shoulder and the anterior tibial muscle at the maximum circumference of the shank. The subject had a rest in a sitting position after coming to the clinical trial room, and the ambient room temperature was controlled at 23±1° C. First, the blood pressure and the heartbeat of the subject were measured. Next, the subject lay down to rest for 30 minutes, and then the physiological data thereof was measured for 200 seconds before being covered by the mattress. After the measurement, the whole body of the subject in the experimental group was covered by the experimental mattress for 20 minutes, and the subject in the control group was covered by a general mattress, and then the subjects were measured in the covered state for 200 seconds.

Figure 7:
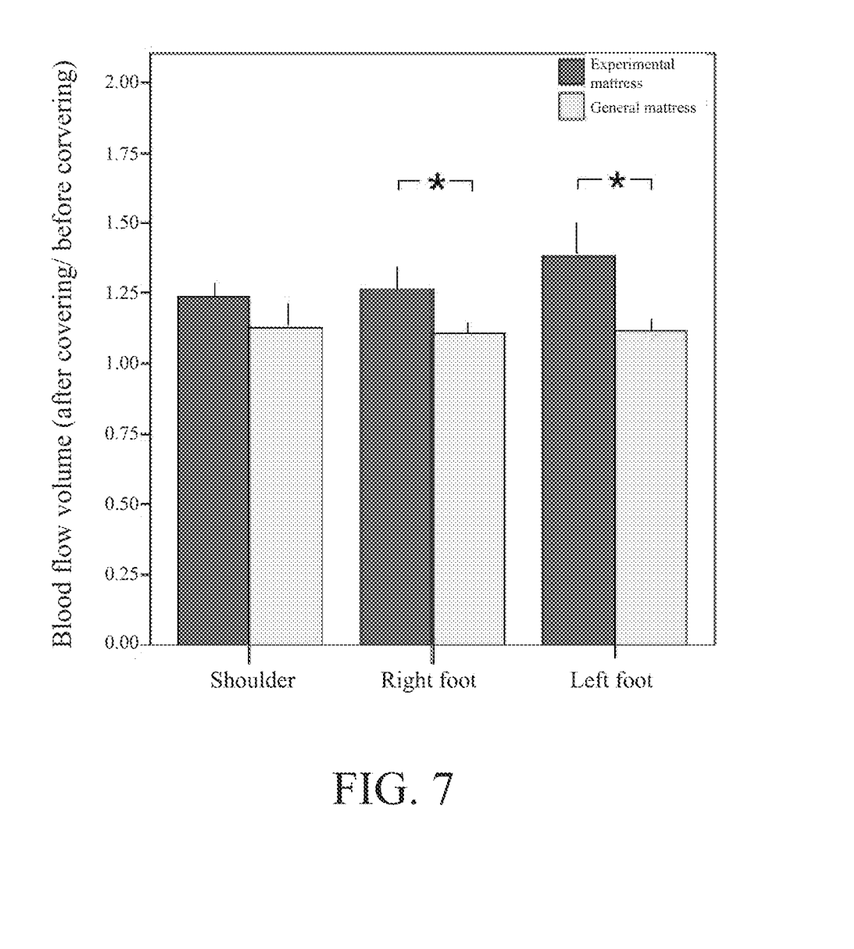
FIG. 7 is a comparison diagram of the microcirculation blood flow volume during the quilt structure of the present invention covers on the different body portions of the diabetic patients.

The experimental results show that for diabetic patients, the mattress provided with the quilt structure 100 having the bio-energetic fibers or the far-infrared fibers 200 of the present invention improved the microcirculation blood flow volume respectively by 11%, 16% and 27% at the shoulder, the right leg and the left leg, and the results were shown in FIG. 7.

Figure 8:
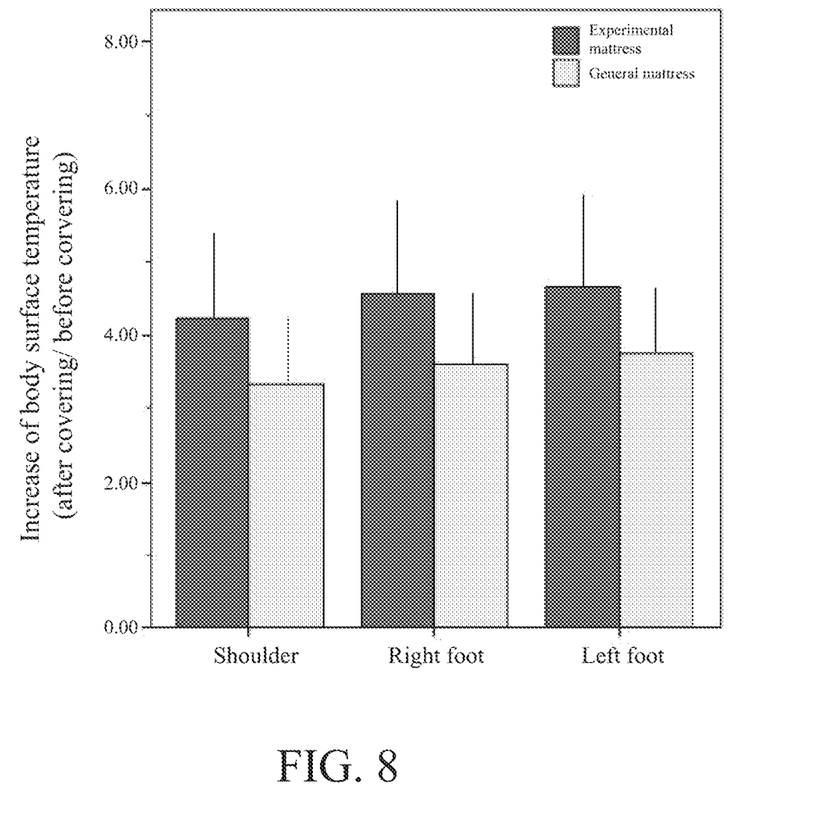
FIG. 8 is a comparison diagram of the body surface temperature during the quilt structure of the present invention covers on the different body portions of the diabetic patients.

On the other hand, for diabetic patients, the mattress provided with the quilt structure 100 having the bio-energetic fibers or the far-infrared fibers 200 of the present invention improved the body surface temperature respectively by 0.9° C., 1.0° C. and 0.9° C. at the shoulder, the right leg and the left leg, and the results were shown in FIG. 8.

Based on the above research results, it is revealed that for a type 2 diabetic patient, the mattress provided with the quilt structure 100 having the bio-energetic fibers or the far-infrared fibers 200 of the present invention was more effective in improving the blood microcirculation of the body surface than the general mattress. In particular, the mattress provided with the quilt structure 100 having the bio-energetic fibers or the far-infrared fibers 200 of the present invention improved the microcirculation blood flow volume by more than 16% when covered in the leg as compared to that of the general mattress, and reached statistical significance. In terms of the warming effect, the mattress provided with the quilt structure 100 having the bio-energetic fibers or the far-infrared fibers 200 of the present invention was also more effective in improving the body surface temperature than the general mattress.

In addition, the quilt structure 100 made of the bio-energetic fibers or the far-infrared fibers 200 of the present invention further has an effect of activating human cortical cells in addition to the above-described effects of improving the blood flow volume and the blood flow rate of the human body. Experiment (3) showing improvement in the skin texture of human body will be disclosed below.

Figure 9:
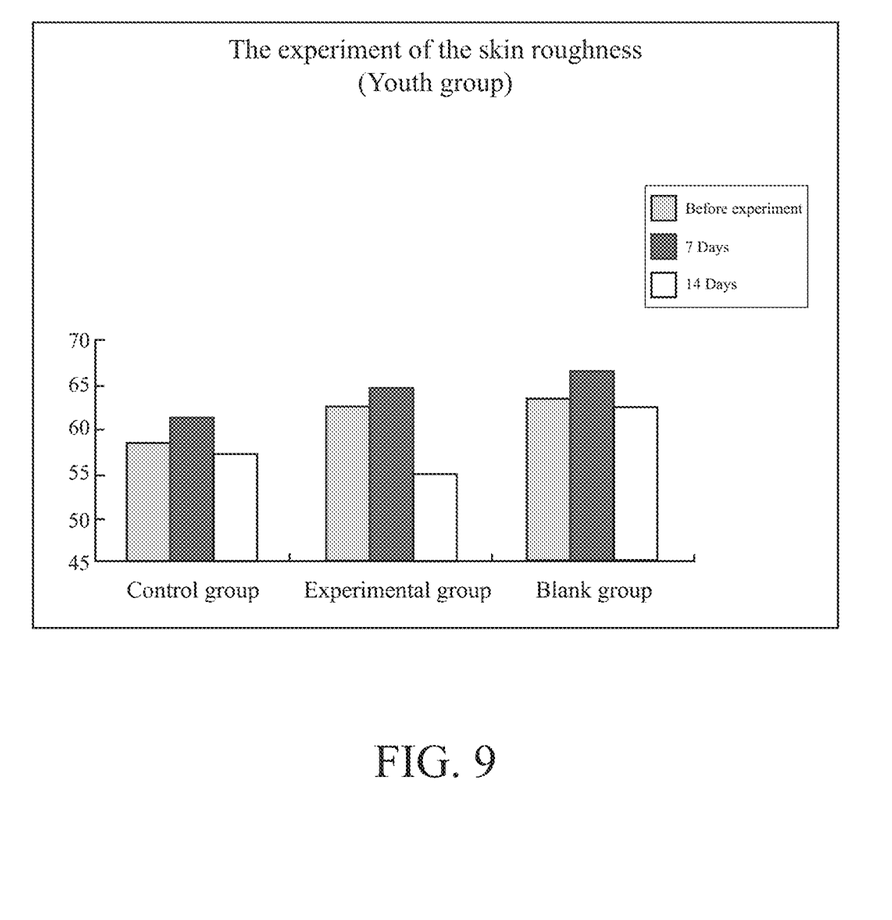
FIG. 9 is a comparison diagram of the experiment on the youth group regarding the skin roughness.
Figure 10:
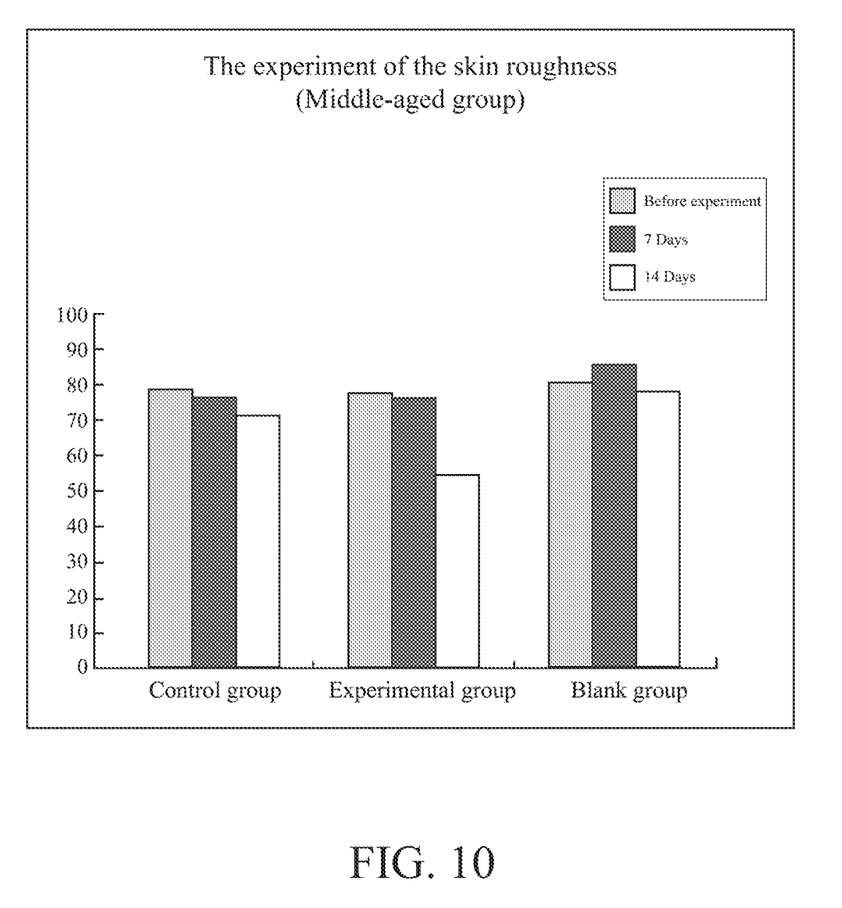
FIG. 10 is a comparison diagram of the experiment on the middle-age group regarding the skin roughness.

The experimental method adopted in Experiment (3) is as follows: during the test, three zones of 2×2 cm were marked on the flexor side of the forearm of the subject. Among the three zones, the first zone (A) was "covered by the fabric containing no bio-energetic fibers or far-infrared fiber", the second zone (B) was "covered by the fabric with bio-energetic fibers or far-infrared fibers", and the third zone (C) was "not covered or coated by anything". Also, parameters of the above skin were measured and recorded by an instrument every seven days, and the statistical operation was continuously performed twice for a total of fourteen days. In addition, the experiment was divided into a youth group (25 females, age 20±3 years old) and a middle-aged group (14 females, age 45±5 years old), and the statistical results of the experiment on the youth group were recorded in Table 2 and FIG. 9, and the statistical results of the experiment on the middle-aged group were recorded in Table 3 and FIG. 10.

In more detail, this experiment used a roughness analyzer on the skin surface, a UV probe was used to capture a skin texture of high definition and contrast, then difference between the skin groove and the skin mound of the skin was calculated by software, and then the roughness of the skin was explained with a mathematical formula. In this experiment, a larger difference between the skin groove and the skin mound obtained through the calculation of the computer software represents rougher texture of the skin.

TABLE 2

| Time/group | Youth group | | | | | | | | |
|---|---|---|---|---|---|---|---|---|---|
|  | Roughness Surface | | | Roughness Volume | | | Roughness R | | |
|  | A | B | C | A | B | C | A | B | C |
| Before test | 543.87 | 580.86 | 597.41 | 58.68 | 62.68 | 63.56 | 55.87 | 61.25 | 62.37 |
| 7 days | 568.5 | 579.19 | 602.04 | 61.43 | 64.62 | 66.37 | 55.87 | 62 | 67.18 |
| 14 days | 493.7 | 450.45 | 515.48 | 57.5 | 55.31 | 62.81 | 53.81 | 53.31 | 59.18 |
| Rate of change % | −9.2 | −22.5 | −13.7 | −2.0 | −11.8 | −1.2 | −3.7 | −13.0 | −5.1 |

Note:
Zone A: fabric 1 (thin, control fabric)
Zone B: fabric 2 (thick, experimental fabric)
Zone C: blank control, no processing
Change rate in skin roughness: [(roughness after 14 days of use − roughness before use) ÷ roughness before use] × 100%

TABLE 3

| Time/group | Middle-aged group | | | | | | | | |
|---|---|---|---|---|---|---|---|---|---|
|  | Roughness Surface | | | Roughness Volume | | | Roughness R | | |
|  | A | B | C | A | B | C | A | B | C |
| Before test | 674.8 | 684.2 | 693.1 | 78.6 | 77.6 | 81.2 | 77.8 | 76.4 | 80.7 |
| 7 days | 668.5 | 676.9 | 688.3 | 76.5 | 76.6 | 84.3 | 75.5 | 72.3 | 77.5 |

TABLE 3-continued

|  | Middle-aged group | | | | | | | | |
|---|---|---|---|---|---|---|---|---|---|
|  | Roughness Surface | | | Roughness Volume | | | Roughness R | | |
| Time/group | A | B | C | A | B | C | A | B | C |
| 14 days | 633.6 | 558.4 | 645.8 | 71.5 | 55 | 78.6 | 73.1 | 63.2 | 79.1 |
| Rate of change % | −6.1 | −18.4 | −6.8 | −9 | −29.1 | −3.2 | −6 | −17.3 | −2 |

Note:

Zone A: fabric 1 (thin, control fabric)

Zone B: fabric 2 (thick, experimental fabric)

Zone C: blank control, no processing

Change rate in skin roughness: [(roughness after 14 days of use − roughness before use) ÷ roughness before use] × 100%

The research results of this experiment were shown in Table 4, and after using the quilt structure 100 made of the bio-energetic fibers or the far-infrared fibers 200 of the present invention for 14 days, the skin roughness of the subjects in the youth group was reduced respectively by 22.5% (surface), 11.8% (volume) and 13% (R), and moreover, the skin roughness of the subjects in the middle-aged group was reduced respectively by 18.4% (surface), 29.1% (volume), and 17.3% (R).

TABLE 4

| | Roughness Change Rate | | |
|---|---|---|---|
| | Roughness surface (%) | Roughness volume (%) | Roughness R (%) |
| Youth group | −22.5% | −11.8% | −13% |
| Middle-aged group | −18.4% | −29.1% | −17.3% |

As can be proved by the above experiments, after using the quilt structure 100 made of the bio-energetic fibers or the far-infrared fibers 200 of the present invention for a long time, the far-infrared rays radiated by the bio-energetic fibers or the far-infrared fibers 200 of the present invention can generate a warming effect in the subcutaneous tissue layer although the far-infrared rays are completely absorbed at the epidermis layer based on the fact that the human skin can be divided into three layers of epidermis, dermis, and subcutaneous tissue from the outside to the inside. Therefore, part of energy of the wavelength emitted by the far-infrared rays radiated by the bio-energetic fibers or the far-infrared fibers 200 of the present invention can be effectively absorbed by the tissue molecules and water molecules of the shallow skin, thereby achieving the effect of reducing the surface roughness of the skin.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A quilt structure with a non-powered energy layer, comprising:
    an insulating layer;
    a first barrier layer and a second barrier layer, being disposed on two opposite sides of the insulating layer respectively;
    a first fabric layer, being disposed on one of the first barrier layer or the second barrier layer opposite the insulating layer; and
    a second fabric layer, being disposed on another of the first barrier layer or the second barrier layer opposite the insulating layer;
    wherein at least one of the insulating layer, the first fabric layer and the second fabric layer has far-infrared fibers and at least one of the first barrier layer and the second barrier layer is a textile containing a metal material,
    wherein the far-infrared fibers comprise:
        a first polymer matrix; and
        a first bio-energetic filler, being dispersed in the first polymer matrix;
        wherein the first bio-energetic filler contains the following elements: titanium (Ti), germanium (Ge), zinc (Zn), aluminium (Al) and magnesium (Mg), and wherein the first far-infrared filler does not contain the following elements: scandium (Sc), vanadium (V), chromium (Cr), cobalt (Co), and antimony (Sb).

2. The quilt structure with a non-powered energy layer according to claim 1, wherein the first fabric layer and the second fabric layer are fleece fabric, breathable fabric or a combination thereof.

3. The quilt structure with a non-powered energy layer according to claim 1, wherein the first barrier layer and the second barrier layer are non-woven fabric or fabric containing printing paints.

4. The quilt structure with a non-powered energy layer according to claim 1, wherein the insulating layer is made of wool, silk, cellucotton, cotton, down feather or a combination thereof.

5. The quilt structure with a non-powered energy layer according to claim 1, wherein the metal material is disposed in at least one of the first barrier layer or the second barrier layer by being formed into metal fibers.

6. The quilt structure with a non-powered energy layer according to claim 1, wherein the metal material is disposed in at least one of the first barrier layer or the second barrier layer by a coating process.

7. The quilt structure with a non-powered energy layer according to claim 6, wherein the metal material is disposed at a side towards the insulating layer.

8. The quilt structure with a non-powered energy layer according to claim 1, wherein the metal material is particles of a metal selected from a group consisting of: gold (Au), platinum (Pt) and a combination thereof.

9. Far-infrared fibers that can be used to make a quilt structure with a non-powered energy layer, comprising an insulating layer, a first barrier layer, a second barrier layer, a first fabric layer and a second fabric layer, the first and second barrier layers disposed on opposite sides of the insulating layer, and the first and second fabric layers disposed on respective first and second barrier layers, wherein at least one of the insulating layer, the first fabric layer and the second fabric layer include the far-infrared fibers, and wherein at least one of the first barrier layer and the second barrier layer is a textile containing a metal material, the far infrared fibers comprising:
 a first polymer matrix; and
 a first bio-energetic filler, being dispersed in the first polymer matrix;
 wherein the first bio-energetic filler contains the following elements: titanium (Ti), germanium (Ge), zinc (Zn), aluminium (Al) and magnesium (Mg), and wherein the first far-infrared filler does not contain the following elements: scandium (Sc), vanadium (V), chromium (Cr), cobalt (Co), and antimony (Sb).

10. The far-infrared fibers according to claim 9, wherein the first bio-energetic filler further contains elements selected from a group consisting of: silicon (Si), copper (Cu), calcium (Ca), iron (Fe), barium (Ba), potassium (K), sodium (Na), and a combination thereof.

11. The far-infrared fibers according to claim 10, wherein the first bio-energetic filler further contains elements selected from a group consisting of: manganese (Mn), nickel (Ni), gallium (Ga), and a combination thereof.

12. The far-infrared fibers according to claim 11, further comprising a second polymer matrix, wherein the second polymer matrix covers the first polymer matrix, and the second polymer matrix has a second bio-energetic filler dispersed therein.

13. The far-infrared fibers according to claim 12, wherein the second bio-energetic filler contains the following elements: titanium, germanium, zinc, aluminium and magnesium.

14. The far-infrared fibers according to claim 9, wherein the first bio-energetic filler further contains elements selected from a group consisting of: manganese (Mn), nickel (Ni), gallium (Ga), and a combination thereof.

* * * * *